US009520793B2

(12) United States Patent
Jacobson et al.

(10) Patent No.: US 9,520,793 B2
(45) Date of Patent: Dec. 13, 2016

(54) STACKED POWER CONVERTER ASSEMBLY (71) Applicant: Raytheon Company, Waltham, MA (US)

(72) Inventors: Boris S. Jacobson, Westford, MA (US); Steven D. Bernstein, Brighton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 156 days.

(21) Appl. No.: 14/492,483

(22) Filed: Sep. 22, 2014

(65) Prior Publication Data

US 2016/0087536 A1   Mar. 24, 2016

(51) Int. Cl.
| | |
|---|---|
| G05F 1/00 | (2006.01) |
| H02J 1/10 | (2006.01) |
| H02M 7/08 | (2006.01) |
| H02M 7/48 | (2007.01) |
| H02M 3/335 | (2006.01) |
| H02M 3/28 | (2006.01) |

(52) U.S. Cl.
CPC ........... *H02M 3/33507* (2013.01); *H02M 3/28* (2013.01)

(58) Field of Classification Search
CPC ............. H02M 2001/0045; H02M 2001/0067; H02M 2001/007; H02M 2001/0074; H02M 2001/0077; H02M 3/285; H02M 3/158; H02M 3/1588
USPC ........... 323/271, 272; 363/65, 69, 70, 71, 72
See application file for complete search history.

(56) References Cited

U.S. PATENT DOCUMENTS

| | | | |
|---|---|---|---|
| 3,740,640 A | 6/1973 | Pittman et al. | |
| 4,320,307 A * | 3/1982 | Schierjott | H05K 9/0066 307/91 |
| 4,942,353 A | 7/1990 | Herbert et al. | |
| 4,977,301 A | 12/1990 | Maehara et al. | |
| 4,978,906 A | 12/1990 | Herbert et al. | |
| 5,312,674 A | 5/1994 | Haertling et al. | |
| 5,602,554 A | 2/1997 | Cepas et al. | |
| 5,745,981 A | 5/1998 | Roshen et al. | |
| 5,777,539 A | 7/1998 | Folker et al. | |
| 5,959,522 A | 9/1999 | Andrews | |

(Continued)

FOREIGN PATENT DOCUMENTS

WO   2013101249 A1   7/2013

OTHER PUBLICATIONS

Invitation To Pay Additional Fees for PCT Application No. PCT/US2015/049602, dated Dec. 23, 2015, pp. 1-7.

(Continued)

*Primary Examiner* — Adolf Berhane
*Assistant Examiner* — Gary Nash
(74) *Attorney, Agent, or Firm* — Cantor Colburn LLP (57) ABSTRACT

A stacked magnetic power converter assembly includes a plurality of converter modules disposed in a stacked arrangement with respect to one another to define a thickness of stacked magnetic power converter assembly. Each converter module includes a primary switching unit, a secondary switching unit, and a converter unit. The converter unit includes a primary terminal in signal communication with the primary switching unit and a secondary terminal in signal communication with the secondary switching unit. Each primary switching unit, each secondary switching unit, and each converter unit is shared among the plurality of converter modules.

17 Claims, 8 Drawing Sheets

(56) References Cited

U.S. PATENT DOCUMENTS

| | | |
|---|---|---|
| 5,973,923 A | 10/1999 | Jitaru |
| 5,990,776 A | 11/1999 | Jitaru |
| 5,999,078 A | 12/1999 | Herbert |
| 6,108,526 A | 8/2000 | Van Der Plas |
| 6,445,272 B1 | 9/2002 | Mercado et al. |
| 6,628,531 B2 | 9/2003 | Dadafshar |
| 6,727,793 B2 | 4/2004 | Piechnick |
| 6,820,321 B2 | 11/2004 | Harding |
| 6,847,284 B2 | 1/2005 | Gamou et al. |
| 6,856,283 B2 | 2/2005 | Jacobson et al. |
| 7,187,263 B2 | 3/2007 | Vinciarelli |
| 7,248,138 B2 | 7/2007 | Chiang et al. |
| 7,262,680 B2 | 8/2007 | Wang |
| 7,304,862 B2 | 12/2007 | Busletta et al. |
| 7,361,847 B2 | 4/2008 | Dunn et al. |
| 7,382,219 B1 | 6/2008 | Lee |
| 8,089,331 B2 | 1/2012 | Jacobson et al. |
| 2002/0044433 A1 | 4/2002 | Inoue et al. |
| 2005/0189566 A1 | 9/2005 | Matsumoto et al. |
| 2007/0221267 A1* | 9/2007 | Fornage ........... H02M 3/285 136/244 |
| 2008/0123312 A1 | 5/2008 | Cheng et al. |
| 2008/0304292 A1* | 12/2008 | Zeng ................ H02M 3/285 363/21.12 |
| 2013/0051082 A1* | 2/2013 | Lee .................. H02M 3/285 363/17 |
| 2014/0211521 A1* | 7/2014 | Mazumder ......... H02M 7/48 363/40 |
| 2014/0340940 A1* | 11/2014 | Ouyang ............. H01F 30/06 363/17 |
| 2015/0029761 A1* | 1/2015 | Trinh ................ H02M 1/36 363/17 |

OTHER PUBLICATIONS

Moody et al., "Electrical power systems for space based radar satellites", Energy Conversion Engineering, Aug. 6-11, 1989 Conference, 1989 (IECEC-89), Proceedings of the 24th Intersociety.

Qiankun et al, "Design of the APF for radar power system based on multi-resolution control", Radar Conference 2013, IET International, Apr. 14-16, 2013.

* cited by examiner

STACKED POWER CONVERTER ASSEMBLY

BACKGROUND

The present disclosure relates generally to power converter systems, and more particularly, to converter systems that contain magnetic components.

Wire-wound power magnetics typically require large and expensive components necessary to achieve power conversion such as, for example, direct current to direct current (DC-DC) power conversion. Conventional power conversion systems have addressed cost issues by using planar magnetic topologies, which are suitable for automated assembly and offer a lower cost alternative. Planar magnetic topologies, however, require a thick printed circuit board (PCB) having an excessive number of individual layers in order to sustain operation at high-voltages such as, for example, 300-600 volts DC (VDC).

Figure 1:
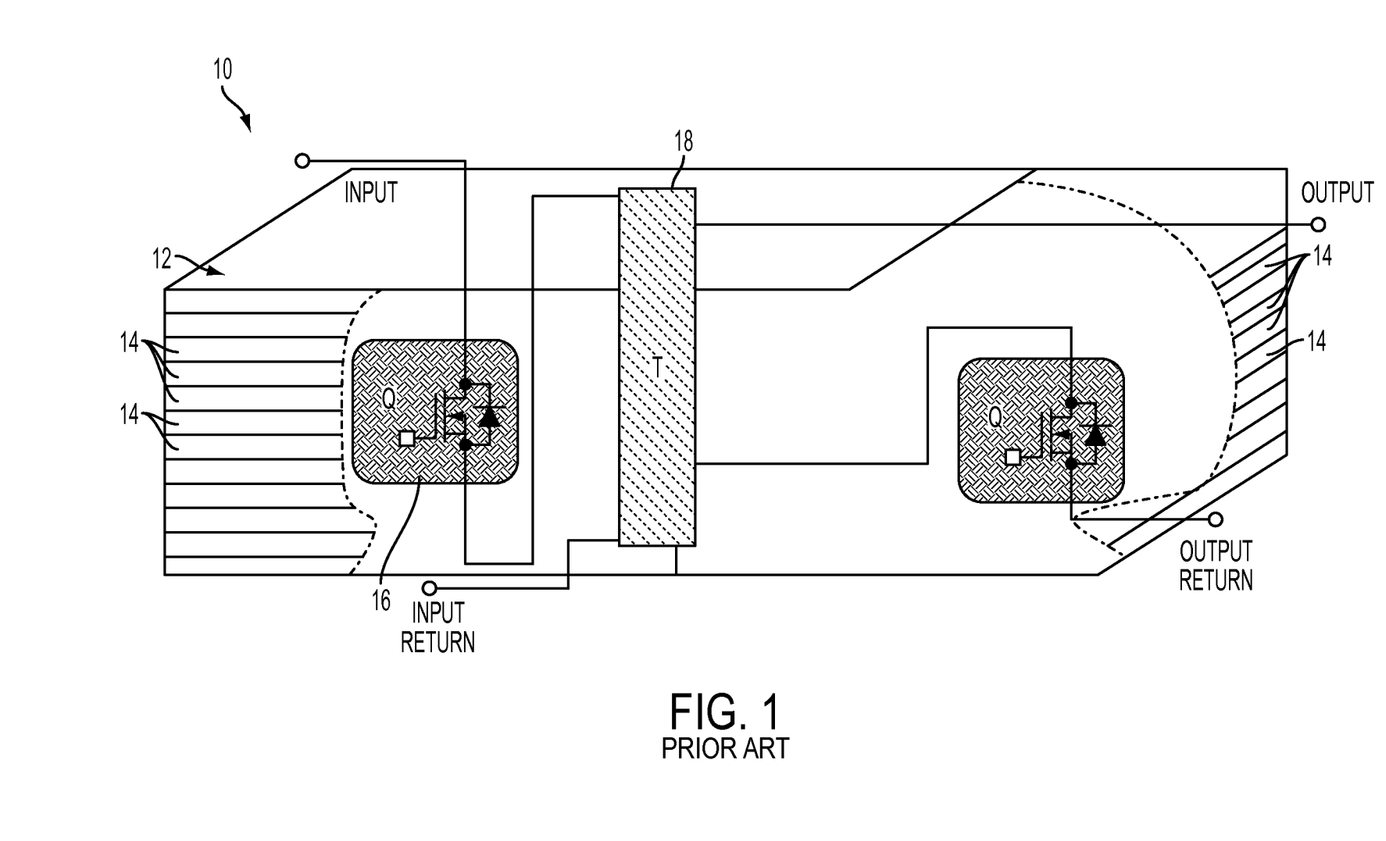
FIG. 1 is a schematic diagram of a conventional planar magnetic power converter.

Turning to FIG. 1, a conventional planar magnetic power converter 10 necessary for converting 2 kilowatts (kW) of power with planar magnetics, for example, includes a single PCB 12 comprising a plurality layers 14 (e.g., 36 layers). Magnetic windings distributed over the number of layers 14 are driven by the high operating voltages (e.g., 600 VDC input and 300 VDC output), can dissipate over 100 W of power and might produce electro-mechanical stress and lead to reduced PCB reliability and failures. A single switching element 16 and a single magnetic unit 18 are each formed in the PCB 12 and are surrounded by the layers 14. As shown in FIG. 1, however, conventional planar magnetic converters 10 do not provide effective cooling paths for both cores and windings. Consequently, conventional planar magnetic power converters 10 generate excessive heat and therefore require additional heat sinks, for example, and other heat exchanger components that increase overall weight and costs.

SUMMARY

According to a non-limiting embodiment, a stacked magnetic power converter assembly includes a plurality of converter modules disposed in a stacked arrangement with respect to one another to define a thickness of stacked magnetic power converter assembly. Each converter module includes a primary switching unit, a secondary switching unit, and a converter unit. The converter unit includes a primary terminal in signal communication with the primary switching unit and a secondary terminal in signal communication with the secondary switching unit. Each primary switching unit, each secondary switching unit, and each converter unit is shared among the plurality of converter modules.

According to another non-limiting embodiment, a converter module is configured to convert a first power level into a second power level. The converter module comprises a metal core board and a printed circuit board. The metal core board includes an insulating layer that supports a primary switching unit and a secondary switching unit. The printed circuit board supports a converter unit in electrical isolation from the metal core board.

According to still another non-limiting embodiment, a method of converting a first power into a second power comprises generating at least one first electromagnetic field in a first direction using a first converter module, and generating at least one second electromagnetic field in a second direction using a second converter module. The first and second converter modules are disposed in a stacked arrangement with each other to define a thickness. The first and second electromagnetic fields travel in opposite directions with respect one another thereby reducing electromagnetic interference.

Additional features are realized through the techniques of the present invention. Other embodiments and features of the invention are described in detail herein and are considered a part of the claimed invention. For a better understanding of the invention with the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Unlike conventional power conversion assemblies that include only a single PCB having an excessive number of layers, at least one embodiment of the disclosure provides a stacked magnetic converter assembly including a plurality of converter modules. Each converter module includes one or more primary switching units, one or more converter units and one or more secondary switching units.

According to a non-limiting embodiment the primary switching units are disposed on the primary side and are connected in parallel with one another, and the secondary switching units are disposed on the secondary side and are connected in parallel with one another. It appreciated, however, that the primary switching units and the secondary switching units can be connected in serial with one another, or a combination of serial and parallel connections can be used to primary switching units and the secondary switching units. The converter units include magnetic assemblies which can be driven at lower voltages in the range of tens of volts as compared to a conventional power conversions assembly.

Figure 2:
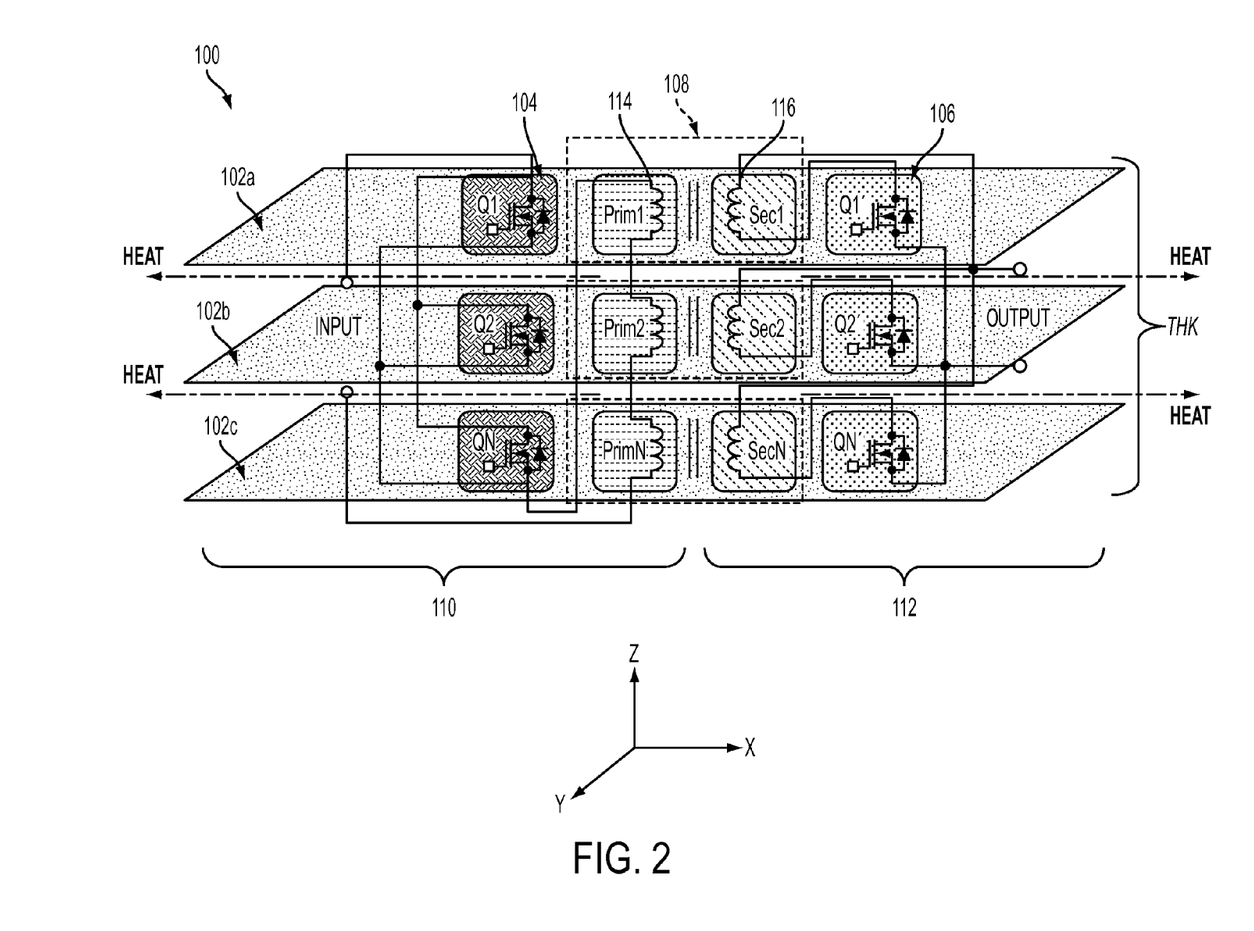
FIG. 2 is a schematic diagram of a stacked magnetic power converter assembly including a plurality of vertically stacked converter modules according to an embodiment.

Referring now to FIG. 2, a stacked magnetic power converter assembly 100 is illustrated according to a non-limiting embodiment. The stacked magnetic power converter assembly 100 includes a plurality of converter modules 102a-102c disposed in a stacked arrangement with respect to one another. Each converter module 102a-102c includes one or more primary switching units 104, one or more secondary switching units 106, and one or more magnetic units 108.

Each primary switching unit 104 is disposed on a primary-side 110 of a respective converter module 102a-102c, and is connected in parallel with one another. Each secondary switching unit is disposed on a secondary-side 112 of a respective converter module 102a-102c, and is also connected in parallel with one another. The magnetic units 108 are fabricated as transformers that include a magnetic assembly, for example. Each magnetic assembly includes a primary winding 114 disposed on the primary-side 110 and a secondary winding 116 disposed on the secondary-side 112.

According to a non-limiting embodiment, the magnetic assembly of each converter module 102a-102c is connected in an input-series-output-parallel (ISOP) topology. In this manner, the primary windings 114 are connected in series, while the secondary windings 116 are connected in parallel. That is, all primary layer turns defined by the primary windings 114 are connected in series and all secondary turns defined by the secondary windings 116 are connected in parallel across the total thickness (THK) of the stacked magnetic power converter assembly 100. The ISOP topology can therefore reduce the number of PCB layers included with each converter module 102a-102c while providing cooling paths extending in a plurality of dimensions (e.g., three-dimensions) for both the winding cores and the windings to effectively cool the stacked magnetic converter assembly 100 as discussed in greater detail below. Further, when a common voltage ranging from, for example, approximately 300 volts (V) to approximately 900 V is applied to the stacked magnetic power converter assembly 100 constructed according to the ISOP topology, the current is the same through each primary winding 114 and the voltage output at each secondary winding 116 is equal. Accordingly, the power output among each converter module 102 is balanced.

Although an input-series-output-parallel (ISOP) topology is described above, it is appreciated, that the primary switching units 104 and the secondary switching units 106 can be connected according to other electrical topologies. For example, the primary windings 114 can be connected in parallel, while the secondary windings 116 are connected in series to define an input-parallel-output-series (IPOS) topology. According to another example, both the primary windings 114 and the secondary windings 116 are connected in series to define an input-series-output-series (ISOS) topology. According to still another example, both the primary windings 114 and the secondary windings 116 are connected in parallel to define an input-parallel-output-parallel (IPOP) topology.

Figure 3A:
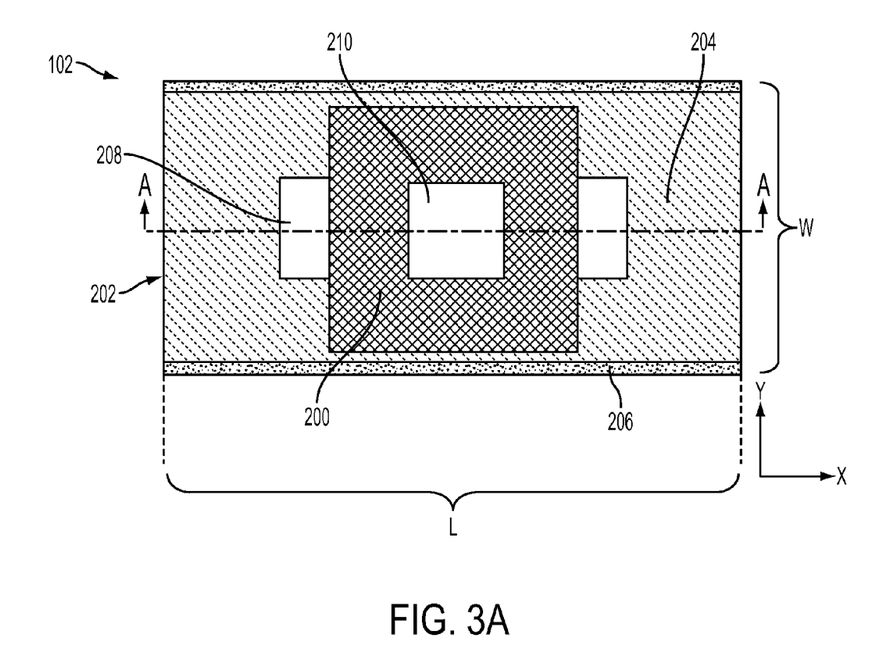
FIG. 3A is top view of a single converter module including a metal core board (MCB) disposed on a printed circuit board (PCB) according to an exemplary embodiment.
Figure 3B:
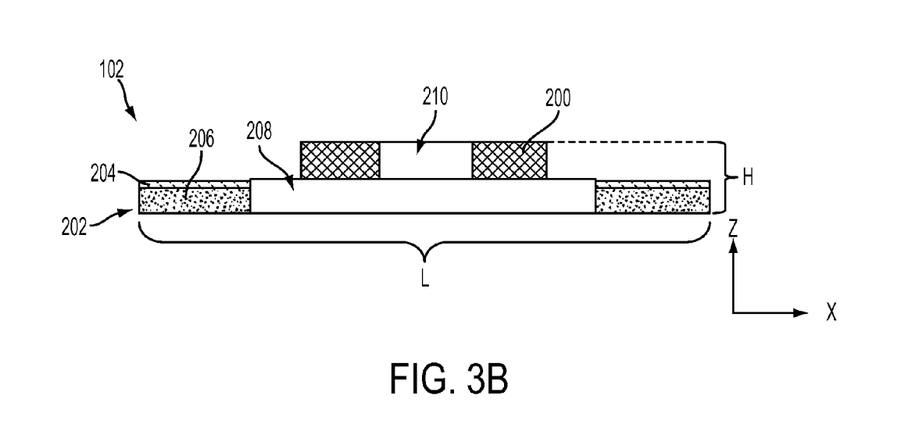
FIG. 3B is a cross-sectional view of the converter module illustrated in FIG. 3A taken along line A-A.

Turning now to FIGS. 3A-3B, a single converter module 102 is illustrated according to a non-limiting embodiment. The converter module 102 includes a printed circuit board (PCB) 200 disposed on a metal core board (MCB) 202. The PCB 200 can include one or more PCB layers as understood by one of ordinary skill in the art. The MCB 202 is formed from various metals and can include one or more MCB layers. For example, the MCB 202 includes an insulating layer 204 formed on a first surface (e.g., an upper surface) of a metal base layer 206. In this manner, one or more electrical components (not shown) may be formed on the insulating layer 204, while being electrically isolated from the metal layer 206 and thus one another. Further, the metal material of the MCB 202 is capable of effectively dissipating heat from electrical components and/or the PCB 200 installed thereon.

The MCB 202 has a core board hole 208 and the PCB 200 has a circuit board hole 210. The core board hole 208 is formed through the insulating layer 204 and extends into the metal base layer 206 to prevent a short of the windings. According to an embodiment, the MCB 202 can include a recess to facilitate placement and mounting the PCB 200. The circuit board hole 210 is formed completely through the PCB 200 and is aligned with the core board hole 208. The core board hole 208 and the circuit board hole 210 are arranged such that a magnetic core (not shown) can extend through the PCB 200, while the PCB 200 is configured to support a winding (not shown) in electrical isolation from the MCB 202. That is, the PCB 200 is configured to support the winding without allowing current to flow between the winding and the MCB 202.

According to an embodiment, the MCB 202 extends along a first axis (e.g., an X-axis) to define a core board length and a second axis (e.g., Y-axis) opposite the first to define a core board width. The core board length and width define a core board surface of the MCB 202. The core board hole 208 is formed through the insulating layer 204 and extends completely through the underlying metal base layer 206. It is appreciated that the core board hole 208 has to extend through the metal base layer 206 to avoid shorting the windings.

The PCB 200 extends along the first axis (e.g., the X-axis) to define a circuit board length and the second axis (Y-axis) to define a circuit board width. The circuit board length and width define a circuit board surface of the PCB 200. According to a non-limiting embodiment, the circuit board surface is smaller than the core board surface. A first side 212a of the PCB 200 is formed on a first side 212b of the MCB 202 while a second opposing side 212b of the PCB 200 is formed on a second opposing side 214b of the MCB 202 such that the PCB 200 extends over the core board hole MCB 208 as further shown in FIGS. 3A-3B. In this manner, the circuit board hole 210 is aligned with the core board hole 208 and allows access to the underlying metal base layer 206. According to another embodiment, the MCB 202 may have a recess that facilitates mounting of the PCB 200. According to a non-limiting embodiment, the stacked arrangement of the PCB 200 and MCB 202 along a third axis (e.g., Z-axis) defines the minimum thickness (e.g., height) of an individual converter module 102.

Figure 4A:
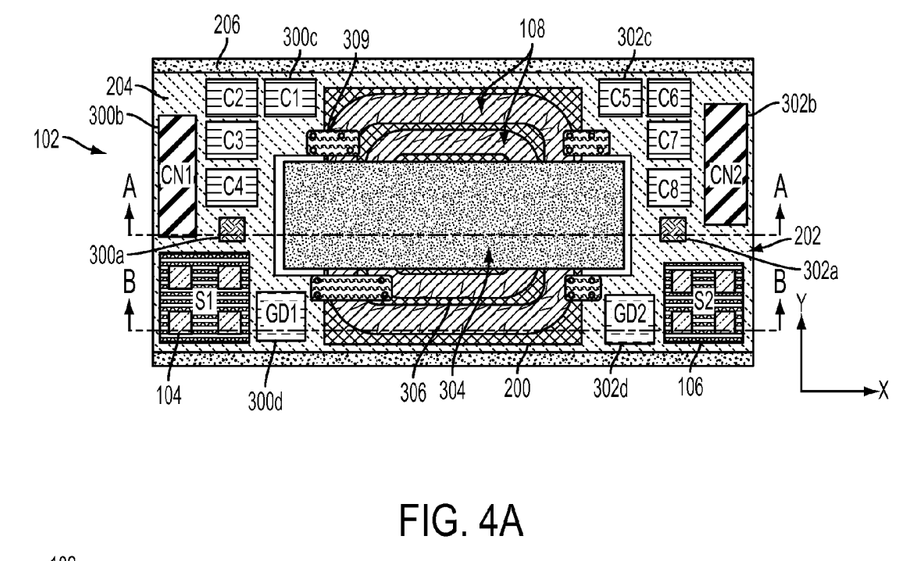
FIG. 4A is a top view of a PCB that supports a winding core and a plurality of electrical components, and a MCB which supports a winding that wraps around the winding core according to an exemplary embodiment.
Figure 4B:
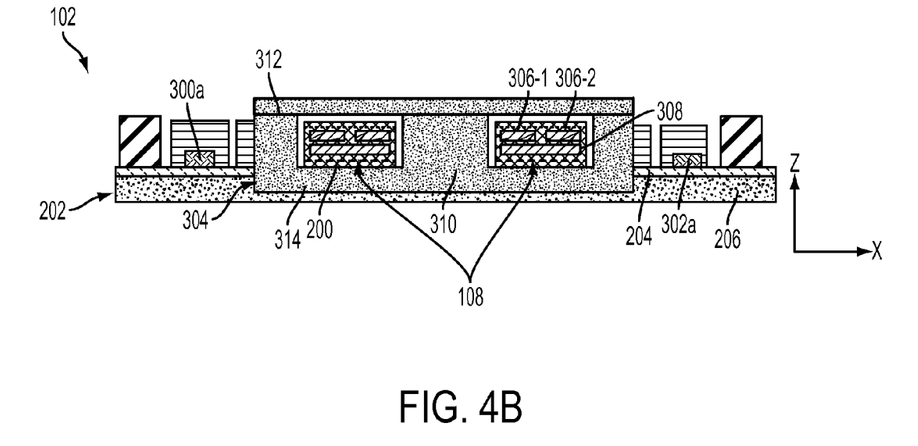
FIG. 4B is a cross-sectional view of the converter module illustrated in FIG. 4A taken along line A-A.

Turning now to FIGS. 4A-4B, a single converter module 102 including various electrical components installed thereon is illustrated according to a non-limiting embodiment. The converter module 102 includes a one or more primary-side electrical components and one or more secondary-side electrical components. The primary-side electrical components include, but are not limited to, the primary switching unit 104, a primary-side microcontroller 300a, input connectors 300b, input capacitors 300c, and primary-side gate drivers 300d. The secondary-side electrical components include, but are not limited to, the secondary switching unit 106, a secondary-side microcontroller 302a, output connectors 302b, output capacitors 302c, and secondary-side gate drivers 302d.

The converter module 102 further includes a magnetic unit 108 constructed as a magnetic assembly. The magnetic unit 108 includes a magnetic core 304, a first winding 306, and a second winding 308. One or more connecting elements 309 can connect a start and an end of the first winding 306 and/or second winding 308 to one or more primary-side components 300 and/or secondary-side components 302.

The magnetic core 304 can have various shapes and can be formed from various magnetic materials including, but not limited to, ferrite. According to a non-limiting embodiment, the winding core 304 includes an inner portion 310 extending between an outer portion 312 and a lower portion 314. The lower portion 314 is disposed in or beneath the aforementioned core board hole 208, and the inner portion 310 extends from the lower portion 314 and through the circuit board hole 210. The outer portion 312 has an "T" shape and is connected to the inner portion 310 and is supported by an upper surface of the PCB 200. Although two windings 306-308 are shown, it is appreciated that the magnetic unit 108 can include more or less windings. The first winding 306 and/or the second winding 308 include one or more layers of turns. For example, the first winding 306 can have a first turn 306-1 and a second turn 306-2.

Figure 5:
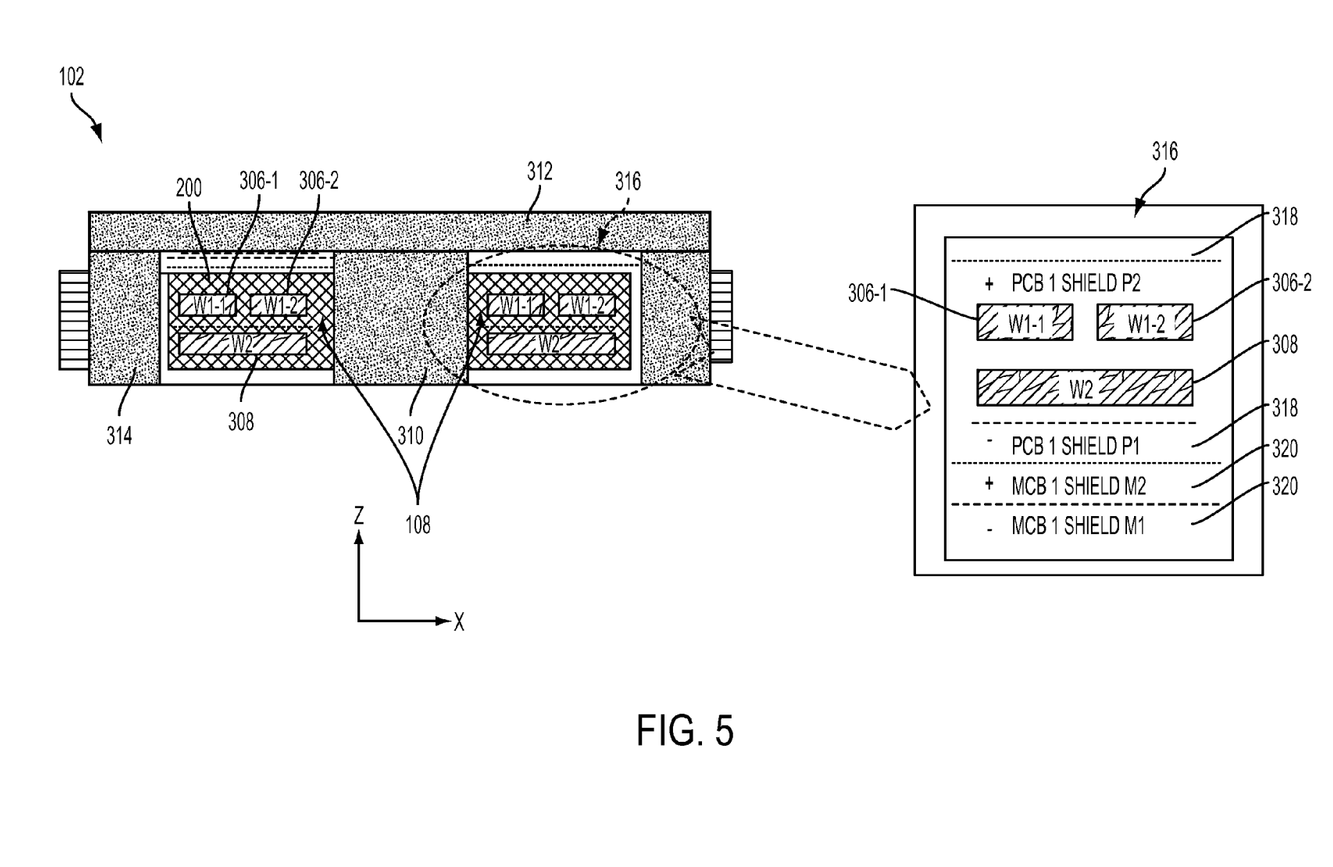
FIG. 5 is a close-up view of a shielding arrangement included in a converter module according to an exemplary embodiment.

Turning now to FIG. 5, the converter module 102 according to at least one embodiment includes a shielding assembly 316 that surrounds the primary and secondary windings 306-308. The shielding assembly 316 includes one or more interleaved PCB shielding layers 318 and/or MCB shielding layers 320 formed in the PCB 200 and MCB 202, respectively. The PCB shielding layer 318 and the MCB shielding layer 320 each have either a first electrical polarity, e.g., a positive polarity (+), or a second electrical polarity, e.g., a negative polarity (−). According to a non-limiting embodiment, the shielding layers are implemented using a serpentine conductor made of a series of courses. Each pair of courses in the serpentine conductor propagates current in either a first direction (e.g., clockwise) or an opposing second direction (counter-clockwise). The opposite directions of the current offset the induced magnetic fields and resulting currents, thereby effectively canceling out the electromagnetic interference (EMI).

The arrangement and orientation of the PCB and MCB shielding layers 318-320 are based on the arrangement of the first and second windings 306-308. For example, the first winding 306 includes a first turn 306-1 and a second turn 306-2. The second winding 308 is disposed above the first winding 306 and includes a single turn. Accordingly, a first MCB shielding layer 320 is referenced to the input DC voltage return having negative polarity (−), and a second MCB shielding layer, 320 is referenced to the DC input having positive polarity (+). A first PCB shielding layer 318 is referenced to the input DC voltage return and a second PCB shielding layer 318 is referenced to the DC input. Further, the first PCB shielding layer 318 is referenced to input DC voltage return while the second PCB shielding layer 318 P2 is referenced to DC input voltage. The arrangement of the shielding layers 318-320 shown in FIG. 5 forms three distributed series-connected capacitors. In this manner, common-mode current flowing through a respective converter module 102 is prevented from flowing to external circuitry.

Figure 6:
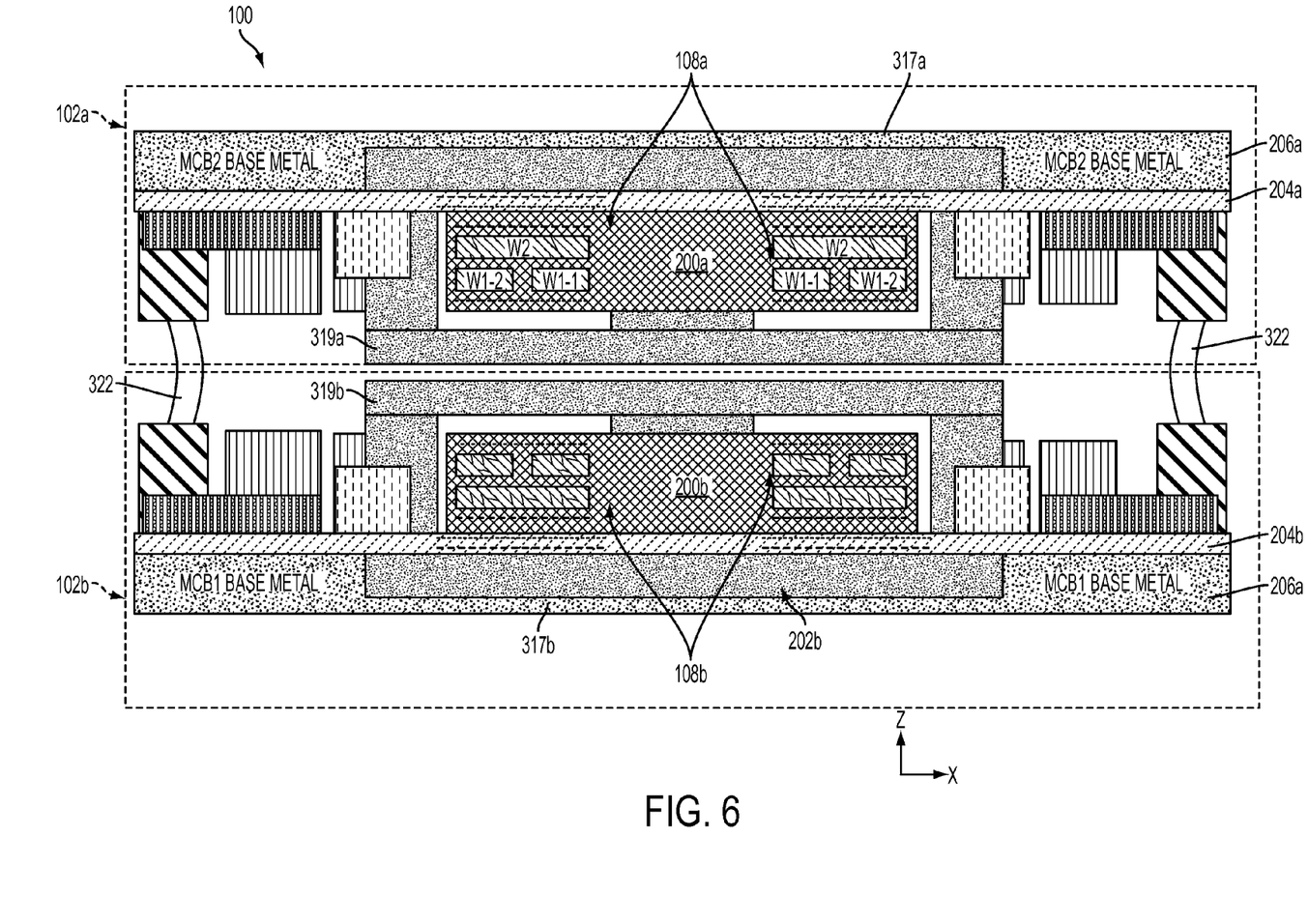
FIG. 6 is a cross-sectional view of a stacked magnetic power converter assembly including a first converter module stacked above a second converter module according to an exemplary embodiment.

Turning now to FIG. 6, a stacked magnetic power converter assembly 100 including a first converter module 102a stacked against a second converter module 102b is illustrated according to an exemplary embodiment. The converter modules 102a-102b contain components similar to those described in detail above. Each converter module 102a-102b includes a an outer surface 317a-317b defined by the metal core board 202a-202b and an inner surface 319a-319b opposite the outer surface 317a-317b. The first converter module 102a and the second converter module 102b are stacked together such that the inner surface 319a of the first converter module 102a faces the inner surface 319b of the second converter module 102b. The stacked arrangement of the first and the second converter module 102a/102b extending along the third axis (e.g., Z-axis) defines a thickness (e.g., height) of the stacked power converter assembly 100. Further, the first PCB 200a and the second PCB 200b are each interposed (i.e., sandwiched) between the first and second insulating layers 204a-204b. The first and second converter modules 102a-102b are electrically connected to one another using one or more connector elements 322. The connector elements 322 can include, for example, flexible printed circuits 322.

Figure 7:
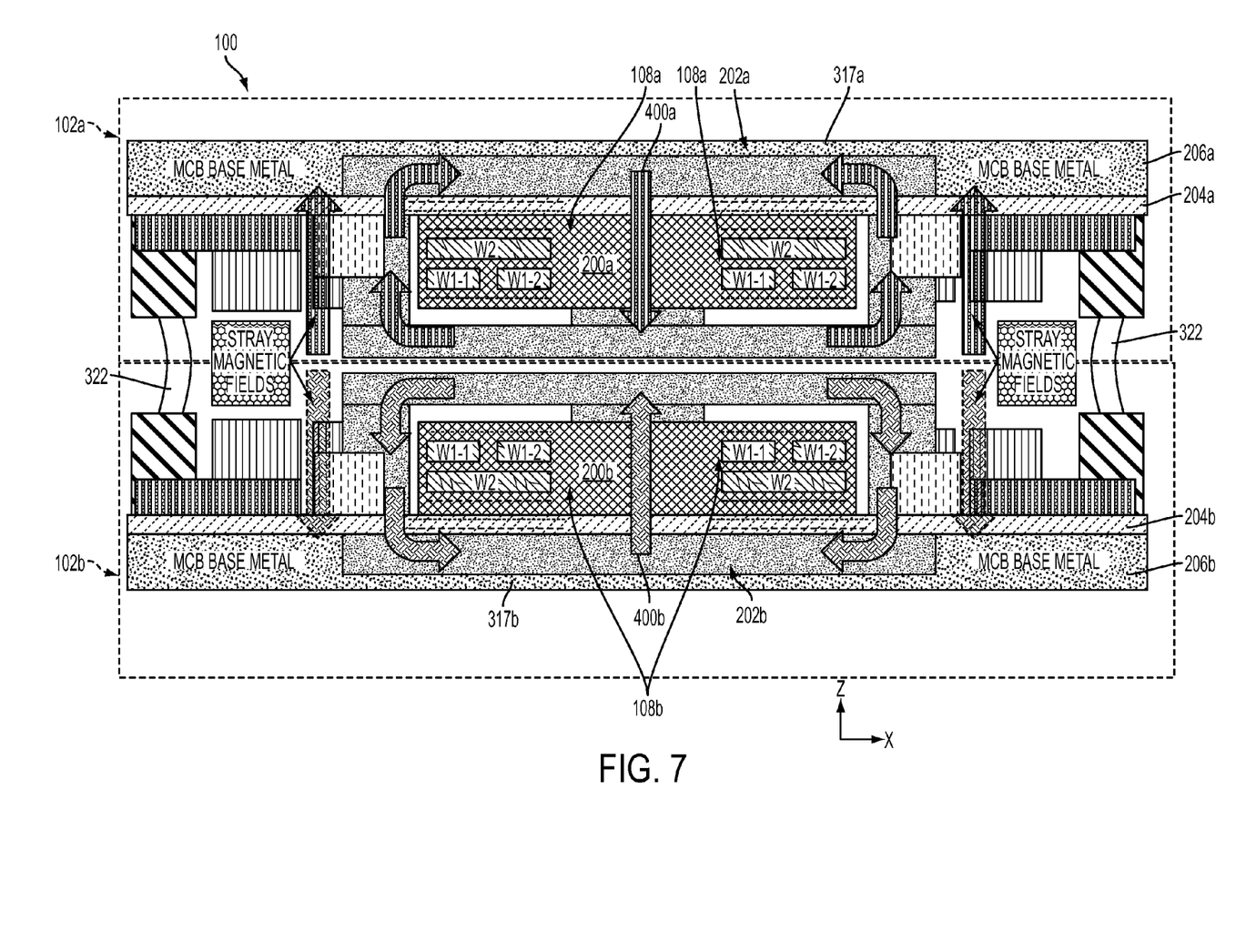
FIG. 7 illustrates an electromagnetic interference suppression feature provided by a stacked magnetic power converter assembly according to an exemplary embodiment.

Referring to FIG. 7, an electromagnetic interference suppression feature provided by the stacked magnetic power converter assembly 100 is illustrated according to a non-limiting embodiment. The first converter module 102a and the second converter module 102b can be synchronized to operate at the same switching frequency. During operation of the stacked magnetic power converter assembly 100, the first and second converter modules 102a-102b generate respective substantially opposing stray electromagnetic fields 400 and 400b from respective magnet assemblies included in the first and second magnetic units 108a-108b. The opposing magnetic fields 400a-400b effectively cancel out one another as understood by one of ordinary skill in the art. In this manner, the stacked arrangement of the first and second converter modules 102a-102b significantly reduces radiated EMI emitted from the stacked magnetic power converter assembly 100. In addition, the first and second MCBs 202a-202b that define the outer surfaces of the stacked magnetic power converter assembly 100 form shield barriers that further reduce the radiated EMI.

Figure 8:
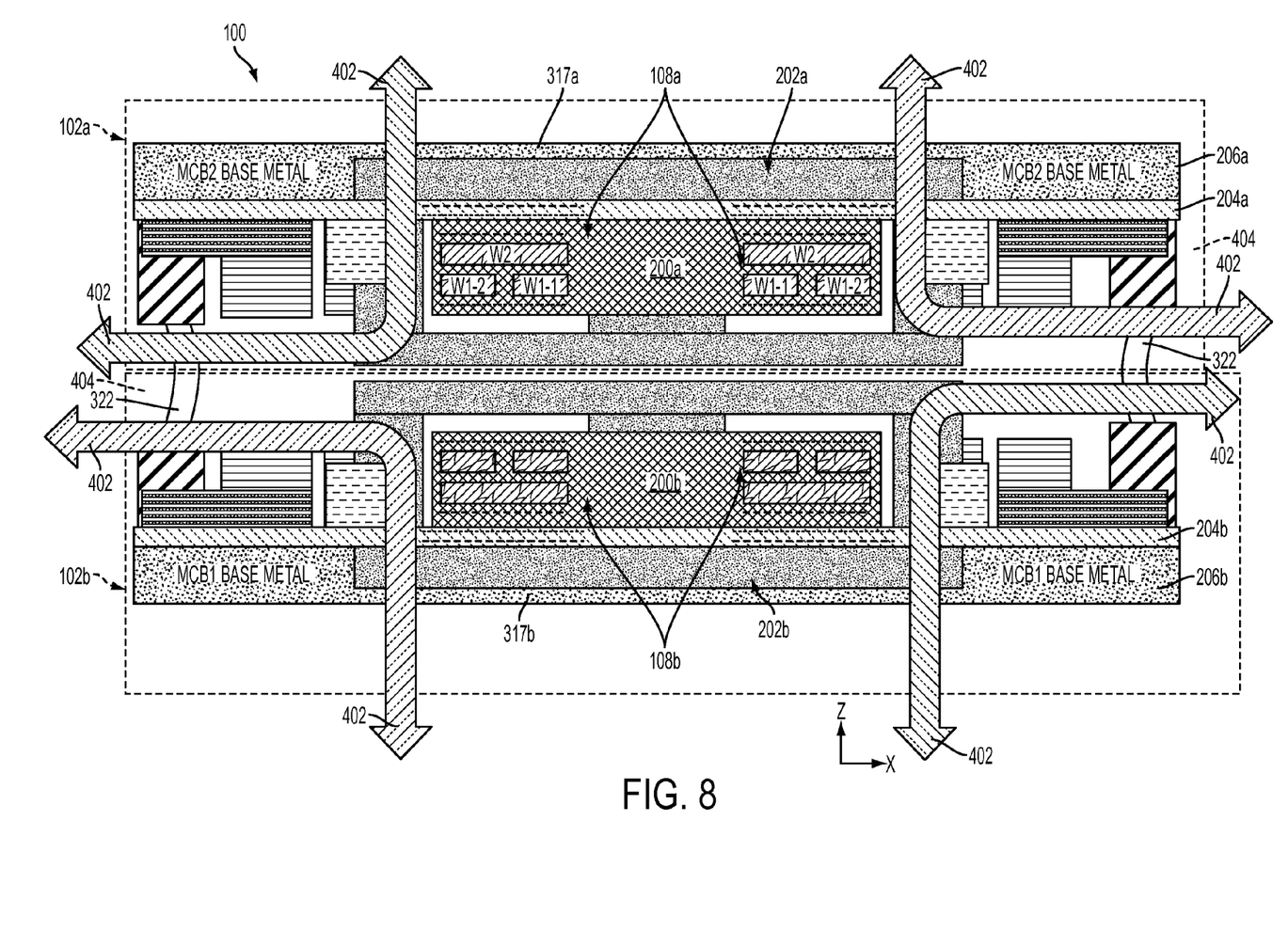
FIG. 8 is a cross-sectional view of a stacked magnetic power converter assembly that includes cooling paths configured to remove heat according to an exemplary embodiment.

Turning now to FIG. 8, a stacked magnetic power converter assembly 100 is illustrated dissipating heat 402 through cooling paths formed in a plurality of stacked converter modules 102a-102b, and which extend along all three dimensions (i.e., all axes) of the stacked magnetic power converter assembly 100. T. Unlike conventional planar magnetic power converters that dissipate heat in only a single axial direction (e.g., the Z-axis), at least one embodiment dissipates along all three axial direction (e.g., the X-axis-, the Y-axis, and the Z-axis). According to a non-limiting embodiment, the each module forms an individual thermally conductive heat path extending along the length (i.e., X-axis) and width (Y-axis) of the respective converter module 102a-102b. For example, the metal base layer 206a of the first converter module 102a and the metal base layer 206b of the second converter module 102b each define respective cooling paths configured to thermally conduct heat. In this manner, each converter module 102a-120b is configured to conductively transfer heat along/through the board and away from the magnetic assembly toward the outer edge of the module spacing between the and second converter modules to reduce the overall internal heat of the stacked magnetic power converter assembly 100.

According to another non-limiting embodiment, each converter module 102a-102b can also define one or more vents 404 which extend along the X-axis and Y-axis. The vents are configured to facilitate heat dissipation along the X and Y axial direction to the exterior environment. For example, spacing between the and second converter modules 102a-102b define vents 404 extending along the X-axis and Y-axis, each which facilitates convective heat transfer along the X and Y axial directions from within the stacked magnetic power converter assembly 100 to the exterior environment. In this manner, heat 402 generated by the primary windings 306, secondary windings 308, winding core 304 and/or other electrical components can be effectively transferred from the stacked magnetic power converter assembly 100. Accordingly, the stacked magnetic power converter assembly 100 can be constructed using smaller heat sinks and other cooling components thereby reducing package sizing and overall costs.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A stacked power converter assembly including magnetics, the stacked power converter comprising:
a plurality of converter modules disposed in a stacked arrangement with respect to one another to define a thickness of stacked magnetic power converter assembly, each converter module including a primary switching unit, a secondary switching unit, and a converter unit having a primary terminal in signal communication with the primary switching unit and a secondary terminal in signal communication with the secondary switching unit,
wherein each primary switching unit, each secondary switching unit, and each converter unit is shared among the plurality of converter modules, and
wherein the primary switching unit of each converter module are connected in parallel with one another, and the secondary switching unit of each converter module are connected in parallel with one another.

2. The stacked power converter assembly of claim 1, wherein the primary terminal receives a first direct current (DC) signal and the converter unit converts the first DC signal into a second DC signal that is output at the second secondary terminal.

3. The stacked power converter assembly of claim 1, wherein each converter unit includes a magnetic assembly including a primary winding and a secondary winding, the primary winding of each converter module connected in series with one another, and the secondary winding of each converter module connected in a parallel with one another across the thickness of the stacked power converter assembly.

4. The stacked power converter assembly of claim 3, wherein each power converter module comprises:
a metal core board including an insulating layer that supports the primary and secondary switching units; and
a printed circuit board that supports the converter unit in electrical isolation from the metal core board.

5. The stacked magnetic power converter assembly of claim 4, wherein the metal core board has a core board surface, the metal core board including an insulating layer formed on an upper surface of the metal base layer, the insulating layer having a core board hole formed therethrough, and
wherein the printed circuit has a circuit board surface that is less than the core board surface, the printed circuit board having a circuit board hole formed therethrough that is aligned with the core board hole.

6. The stacked magnetic power converter assembly of claim 5, wherein each converter unit includes a magnetic core having at least one portion that extends into at least one of the core board hole and the circuit board hole, wherein the first and second windings wrap around the winding core to form the magnet assembly configured to convert the first DC signal into the second DC signal.

7. The stacked power converter assembly of claim 6, further comprising at least one shielding assembly that surrounds the primary and secondary windings and at least one cooling path that extends in a direction opposite the thickness of the stacked power converter assembly.

8. The stacked power converter assembly of claim 7, wherein the at least one shielding assembly comprises:
at least one PCB shielding layer formed in the printed circuit board;
at least one MCB shielding layer formed in the metal core board and interleaved with respect to the PCB shielding layer,
wherein the at least one PCB shielding layer has a first electrical orientation and the at least one MCB shielding layer has a second electrical orientation opposite from the first orientation.

9. The stacked magnetic power converter assembly of claim 8, wherein each converter module includes outer surface defined by the metal core board and an inner surface opposite the outer surface, and
wherein a first converter module and a second converter module are stacked together such that the inner surface of the first converter module faces the inner surface of the second converter module.

10. The stacked magnetic power converter assembly of claim 9, wherein the metal core board defining the inner surface of the first converter module and the metal core board defining the inner surface of the second converter module form shield barriers configured to reduce electromagnetic field interference emitted from the stacked magnetic power converter assembly.

11. A converter module configured to convert a first power level into a second power level, the converter module comprising:
a metal core board extending along a first core board direction and a second core board direction to define a core board surface, the metal core board including an insulating layer that supports a primary switching unit and a secondary switching unit, and a metal base layer having the insulating layer formed thereon, the metal core board having a core board hole formed therethrough; and a printed circuit board that supports a converter unit in electrical isolation from the metal core board, the printed circuit board extending along a first circuit board direction and a second circuit board direction to define a circuit board surface that is less than the core board surface, and having a circuit board hole formed therethrough that is aligned with the core board hole.

12. The converter module of claim 11, wherein each converter unit includes a magnetic core having at least one portion that extends into at least one of the core board hole and the circuit board hole, wherein the first and second windings wrap around the magnetic core to form the magnetic assembly configured to convert the first DC signal into the second DC signal.

13. The converter module of claim 12, further comprising at least one shielding assembly that surrounds the primary and secondary windings.

14. The converter module of claim 13, wherein the at least one shielding assembly comprises:
  at least one PCB shielding layer formed in the printed circuit board;
  at least one MCB shielding layer formed in the metal core board and interleaved with respect to the PCB shielding layer.

15. The converter module of claim 14, wherein the at least one PCB shielding layer has a first electrical polarity and the at least one MCB shielding layer has a second electrical polarity opposite from the first orientation.

16. A method of converting a first power into a second power, the method comprising:
  generating at least one first electromagnetic field in a first direction using a first converter module; and
  generating at least one second electromagnetic field in a second direction using a second converter module disposed in a stacked arrangement with the first converter module to define a thickness, wherein the first and second electromagnetic fields travel in opposite directions with respect one another to reduce electromagnetic interference; and
  cooling the stacked arrangement in response to transferring heat via a plurality of three-dimensional cooling paths, the cooling paths including a first cooling path formed on a first thermally conductive surface of the first converter module and extending in directions opposite the thickness and a second cooling path formed on a second thermally conductive surface of the second converter module and extending in a directions opposite the thickness.

17. The method of claim 16, further comprising cooling the stacked arrangement in response to conveying heat through at least one vent formed between the first and second converter modules, the vent extending in a direction opposite the thickness.

* * * * *